United States Patent Office 3,250,970
Patented May 10, 1966

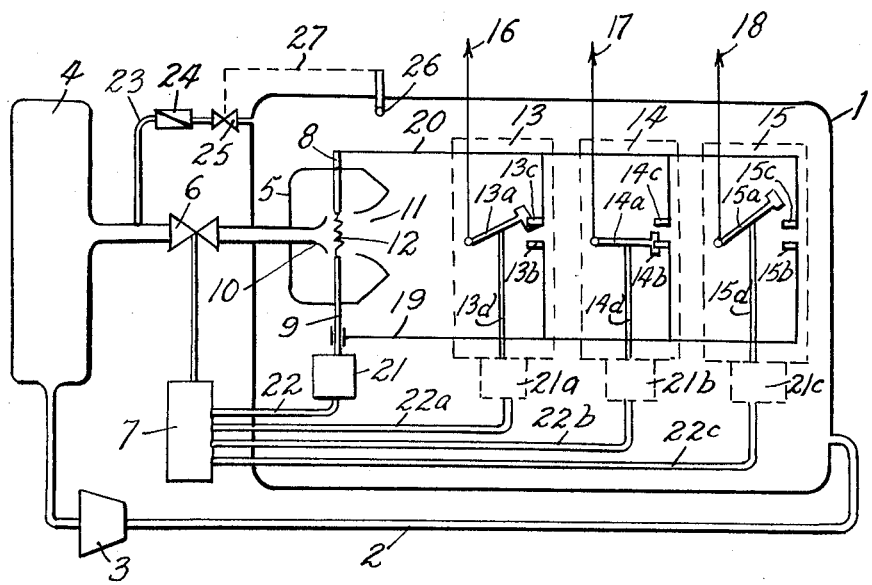

3,250,970
ENCLOSED GAS ISOLATED AND OPERATED ELECTRICAL SUPPLY AND DISTRIBUTION SWITCHING-STATION WITH ONE OR MORE GAS BLAST POWER SWITCHES
Jean Passaquin, Le Havre, France, assignor to Aktiengesellschaft Brown, Boveri & Cie., Baden, Switzerland, a joint-stock company
Filed May 17, 1963, Ser. No. 281,309
Claims priority, application France, July 2, 1962, 902,663
3 Claims. (Cl. 200—148)

The present invention concerns an encased electric switch plant with feed and delivery circuits, which can be connected with each other by means of disconnecting or reversing switches as well as by means of an operating or auxiliary bus bar system, and by power switches whose number is less than that of the circuits. It has already been suggested to design switch plants with several feed and delivery circuits in such a way that the current is switched in each circuit by power switches whose number is less than that of the circuits, preferably only a single power switch being provided for the entire plant. The connection and disconnection of the circuits to the operating and auxiliary bus bars is effected by means of switching devices with a low switching power, such as load isolators or reversing switches, where the switches only work at low currents or low voltages between the contacts. The switches are actuated by means of mechanical, electric or other driving means which are common to several or all circuits and which serve at the same time to drive the power switch or switches if more than one is used. The driving means for the switching devices use the energy of a compressed fluid which originates preferably from a central storage vessel. This fluid can consist of the same medium that is used as an insulating fluid for the common casing of the encased switch plant.

It has also been suggested to fill the casing with a gaseous isolating substance of high dielectric strength. There are power switches, where high pressure extinguishing gas, after having acted on the arc in the switching zone, is collected in a low-pressure tank, from where it is returned through a compressor to the high pressure tank. This closed gas cycle is expedient when the gas used is expensive, or has a certain toxicity resulting from the action on the gas by the arc, so that it cannot be discharged into the atmosphere. Another advantage of the closed cycle is that the noise caused by the escape of the compressed gas into the atmosphere is eliminated to a great extent.

The present invention relates to the problem of providing a simple and inexpensive solution for such an encased switch plant, where gas insulation can be used with advantage in combination with pressure gas power switches with a closed gas cycle. It is proposed according to the invention that the common casing for the bus bars and the switching device be filled with an insulation gas, or vapor, under a predetermined pressure, which can be used, if necessary, for driving the switching devices, and that the casing be used at the same time to receive the gas, or vapor, for extinguishing the arc in the power switches, means being provided to ensure a gas flow in the casing for cooling.

The principle of the invention is illustrated more fully on the basis of the accompanying drawing which represents an embodiment of the invention in somewhat schematic form.

With reference now to the drawing, 1 designates the common casing of the electrical switching station, which is connected over a pipe line 2 and a compressor 3 with a tank 4. The tank 4 contains the high pressure gas which serves as an extinguishing agent for the arc in the power switch, and as an insulating agent in the casing 1, and, if desired, also as a driving agent for the switching devices. In order to simplify the drawing, all additional devices, as well as details which have no direct bearing on the invention, have been omitted. The tank 4 is connected with the power switch, which is housed in the casing 1 and indicated schematically by its extinguishing chamber 5, over the valve 6. The valve is opened and closed by a control device 7, which is also common to the drives 21 for the switching devices of the station. The extinguishing chamber 5 of the power switch contains the stationary contact piece 8 and the movable contact piece 9. The arc 12 formed upon disconnection between these contact pieces is fed with pressure gas from tank 4 by means of a nozzle 10, after which the gas flows through the aperture 11 into the casing 1. Disconnecting switches denoted at 13, 14 and 15 are utilized to connect the feed and delivery circuits 16, 17, 18 selectively with the operating bus bar 19 or with the auxiliary bus bar 20. The driving devices for the power switch 8, 9 and the switches 13, 14, 15 are indicated at 21, 21a, 21b and 21c, respectively and preferably the pressure gas stored in the casing 1 is used as a driving medium. For control of the drives 21, 21a, 21b and 21c by the control device 7 are provided the transmission members 22, 22a, 22b and 22c. The gas expanding during the disconnection of the power switch from the extinguishing chamber 5 into the casing 1 is exhausted again by the compressor 3, whose connection and disconnection is effected by a manometric device, which is known in itself and is not therefore included in the drawing. This manometer device has the function of keeping the pressure in the casing 1 and in the tank 4 within the provided limits.

Each of the disconnecting switches, e.g. switch 13 is provided with a movable contact member 13a which is engageable with stationary contact 13b connected to an operating bus bar 19 and also engageable with another stationary contact 13c connected to an auxiliary bus bar 20. The movable contact member 13a is actuatable over linkage 13d by its drive 21a. Contact member 13a is widened at its outer end to present a head part sufficiently wide to permit uninterrupted current passage between the two bus bars 19 and 20 during the switching operation. The other two disconnecting switches 14 and 15 are of the same construction as switch 13. The three disconnecting switches are depicted in different positions. Switch 15 is in a disconnected state, i.e. the right branch feed and delivery circuit 18 is separated from bus bars 19 and 20. Switch 14 is connected at contact 14b to thus connect the center branch delivery circuit 17 with the operating bus bar 19. The movable contact 13a of switch 13 assumes an instantaneous position in which the left branch delivery circuit 16 is connected with the auxiliary bus bar 20 as contact 13a engages contact 13c. In this phase of the movement, current flow is interrupted by the contacts 8, 9 of the load circuit breaker 5, as depicted by the arc 12 caused by the disconnection.

In the normal position, contacts 8 and 9 of the load breaker 5 are closed. It is assumed that under such conditions, delivery circuit 16 is still connected to bus bar 19 by virtue of the fact that contacts 13a, 13b of switch 13 are closed. In order to disconnect delivery circuit 16, a disconnecting signal is transmitted from the control device 7 over transmission member 22a to drive 21a of disconnecting switch 13. Drive 21a effects a counterclockwise rotation of contact 13a, the contacts 13b, 13c being at first connected with each other. As soon as switch contact 13a leaves contact 13b, and is only engaged with contact 13c, the load breaker switch 5 receives a disconnect signal from control device 7 and drive 21 serves to separate the load contacts 8 and 9. This draws the arc 12 which is then blasted with high pressure gas from tank 4 by way of nozzle 10 since blast valve 6 is then temporarily opened by the control device 7, allowing the gas to pass through. This extinction phase corresponds to the moment represented in the drawing. As soon as arc 12 is extinguished blast valve 6 recloses and switch contact 13a leaves contact 13c and moves into the disconnecting position corresponding to the contact positions depicted for disconnecting switch 15. The disconnection of delivery circuit 16 is now completed and the contacts 8, 9 of load breaker 5 can then be reclosed through action of the control device 7 and drive 21, if in the next switching operation, for example, the delivery branch 17 is to be disconnected from bus bar 19.

Over a pipe line 23, a reducing valve 24, and a shut-off cock 25, another connection is established between tank 4 and casing 1 which by-passes valve 6, the passageway through the shut-off cock 25 being controlled in dependence on the temperature in the casing 1. To this end, a thermostat 26 is provided in the casing 1, which acts in known manner over a pipe line 27 on the shut-off cock 25. The reducing valve 24 is set for a starting pressure which is slightly higher than the predetermined pressure for the casing 1. If the temperature in the casing 1 exceeds a predetermined value the thermostat 26 responds and the shut-off cock 25 is opened, so that gas can flow from tank 4 into the casing. The pressure will thus rise in the latter beyond the predetermined value, so that the compressor 3 is actuated and the gas is returned over the pipe line 2 into the tank 4. Since the gas enters the casing 1 at a casing wall which is opposite the outlet, the gas practically traverses the entire casing, carrying along the heat stored therein. As soon as the temperature in the casing has reached again its normal value, the thermostat 26 effects the closing of the shut-off cock 25, while the compressor 3 remains in operation until the pressure has likewise attained its normal value.

Naturally other devices are also provided, for example, to replenish the gas supply in case of leaks, as well as control and safety elements as they are necessary for the proper operation of the plant. However, these devices which, per se, are not essential to the invention, have not been included in the drawing in order to avoid unnecessary complications.

I claim:
1. In an enclosed electrical switching station, the combination comprising a casing, at least one power switch within said casing, a plurality of switching devices in said casing, a bus bar system in said casing connecting said switching devices with each other and with said power switch, said switching devices serving to control a plurality of feed and delivery circuits and the number of said circuits being greater than the number of said power switches, said casing being filled with a pressurized insulating gaseous fluid, a storage tank for said gaseous fluid, a first conduit including a first control valve therein and which connects an outlet from said storage tank with the interior of said casing for leading the gaseous fluid from said storage tank to the vicinity of the contacts of said power switch for extinguishing the arc drawn between said contacts, actuating means within said casing for and individual to said power switch and each of said switching devices, each said actuating means being powered by the pressurized gaseous fluid within said casing and being individually controlled by a control device, a second conduit including a compressor therein controlled by the pressure of the gaseous fluid within said casing and which serves to connect an outlet from said casing with a return inlet to said storage tank, a third conduit including a second control valve therein and which serves to connect an outlet from said storage tank with the interior of said casing, said second valve being normally closed, and means responsive to a predetermined increase in temperature of the gaseous fluid within said casing for opening said second valve and starting said compressor to establish a circulation of gaseous fluid between said storage tank and casing by-passing said first conduit for cooling said gaseous fluid within said casing as well as said power switch and switching devices.

2. An enclosed electrical switching station as defined in claim 1 wherein said third conduit between said storage tank and casing includes a reducing valve effective when said second valve is opened to establish such an increase in pressure within said casing as to effect a start-up of said compressor.

3. An enclosed electrical switching station as defined in claim 1 wherein said third conduit enters said casing at one end thereof and said second conduit leaves said casing at the opposite end thereof.

References Cited by the Examiner
UNITED STATES PATENTS

| | | | |
|---|---|---|---|
| 2,459,600 | 1/1949 | Strom | 200—148 |
| 2,955,182 | 10/1960 | Caswell et al. | 200—148 |
| 3,009,042 | 11/1961 | Schrameck | 200—148 |

KATHLEEN H. CLAFFY, *Primary Examiner.*

JOHN F. BURNS, *Examiner.*

S. H. BOYER, J. J. BOSCO, *Assistant Examiners.*